United States Patent
Suero

(12) 
(10) Patent No.: US 6,427,871 B1
(45) Date of Patent: Aug. 6, 2002

(54) PROGRAMMABLE LIQUID DISPENSING DEVICE WITH USER READABLE INDICATORS

(76) Inventor: Anthony Suero, 5004 Bilper Ave., Lindenwood, NJ (US) 08021

( * ) Notice: Subject to any disclaimer, the term of this patent is extended or adjusted under 35 U.S.C. 154(b) by 0 days.

(21) Appl. No.: 09/604,641

(22) Filed: Jun. 27, 2000

Related U.S. Application Data

(63) Continuation-in-part of application No. 09/220,041, filed on Dec. 23, 1998, now abandoned.

(51) Int. Cl.[7] .................................................. B67D 5/22

(52) U.S. Cl. ............................ 222/36; 222/40; 222/641

(58) Field of Search .............................. 222/23, 36, 37, 222/38, 40, 639, 640, 641

(56) References Cited

U.S. PATENT DOCUMENTS

| | | | | |
|---|---|---|---|---|
| 4,265,370 A | * | 5/1981 | Reilly ......................... | 222/25 |
| 4,436,223 A | * | 3/1984 | Wilson ........................ | 222/36 |
| 4,736,871 A | * | 4/1988 | Luciani et al. ................ | 222/25 |
| 5,255,819 A | * | 10/1993 | Peckels ......................... | 222/1 |
| 5,511,694 A | * | 4/1996 | Rohm ........................... | 222/27 |
| 5,816,448 A | * | 10/1998 | Kobold ......................... | 222/36 |

* cited by examiner

Primary Examiner—Joseph A. Kaufman

(57) ABSTRACT

A dispensing device with user readable indicators for tracking information associated with a succession of pouring events. Each pouring event dispensing a pre-determined volume of liquid from a liquid holding container, upon which the dispensing device is installed, via a dynamically calibrated time interval. The dispensing device including a user interface having a display and keypad and arranged to provide to the user pouring related information during and after each pouring event.

14 Claims, 2 Drawing Sheets

PROGRAMMABLE LIQUID DISPENSING DEVICE WITH USER READABLE INDICATORS

CROSS REFERENCE TO RELATED APPLICATION

The subject matter of this application represents a continuation-in-part of U.S. application Ser. No. 09/220,041 filed on Dec. 23, 1998 now abandoned.

TECHNICAL FIELD

The present invention relates to liquid dispensing devices with flow indicators. More particularly, the invention pertains to tracking information related to the amount of liquid poured from a liquid holding container.

BACKGROUND ART

The management of liquor dispensing and the collection of the corresponding receipts relative to the operation of a bar and or restaurant, has posed many problems for owners and management persons of such establishments. One such problem involves the attainment of a reasonable correspondence between the number of drinks poured and the cash received by the establishment for the poured drinks. In many bars and restaurants, liquor is liberally poured and many drinks may be provided free of charge. It has therefore been difficult for management to maintain an accurate relationship between the amount of liquor used relative to the net income of the establishment. While conventional shots of liquor are relatively inexpensive to the operator of the bar or restaurant, the overall expenses, including labor and overhead, necessitate a substantial charge for each drink. Thus, the profits involved in the operation of the bar or restaurant depend on accurate charging and maintenance of receipts relative to the corresponding drinks poured, mixed and served to customers.

The use of devices to monitor and indicate the amount of liquid remaining in a liquid holding container is well known in the art. One type of dispensing device, which is exemplified by U.S. Pat. No. 4,436,223 to Wilson, provides for direct monitoring of liquid via a pair of electrical contacts that extend (say from diametrically opposed locations) into a conduit through which the liquid in the container is dispensed. These devices employ the liquid to complete a circuit, thereby starting a timing or interval measuring counter means. The Wilson device, however, and others like it, will exhibit poor accuracy and or fail to detect liquid being dispensed slowly (i.e., with the container not fully inverted or substantially upside down), as the liquid dispensing conduit may not be passing enough liquid to suitably and consistently contact both of the liquid sensing contacts. Also, even if the liquid sensing contacts are suitably shorted via the liquid, if the dispenser is of the type that does not dispense a fixed amount of liquid (pre-measured via some means of the dispenser) the flow rate will vary as the liquid contained in the container or bottle is dispensed. As such, when pouring drinks and not using an external measuring means, such as a 'shot glass', the Wilson device and others like it are quite inaccurate. Further, the Wilson device appears to increment a count representing a pre-determined amount of liquid each time the sensing contacts are shorted, thereby indicating another predetermined volume of liquid has been dispensed, whether it has or not. Skilled persons will recognise a number of problems that are possible with such an arrangement.

An example of an improved version of the Wilson invention is provided by U.S. Pat. No. 4,736,871 to Luciani et al. The Luciani device includes liquid sensing contacts as well as a tilt switch to indicate when the container has been sufficiently tilted to begin counting. This solves the problems contemplated with regard to insufficient tilting, but still may suffer from other problems such as liquid slowly being poured with a slight tilt of the container, while the tilt switch is not activated. As such, the question becomes "what is a sufficient tilt" to close the tilt sensing switch.

Luciani also employs a pulse generator to generate a series of pulses when the tilt switch and liquid sensing contacts cause a counter to count. However, once set, the rate at which the pulses are generated is fixed and not adjusted dynamically to account for flow rate changes. Those skilled in the art will understand yet other limitations inherent to the Luciani device (and equivalents).

Another type of dispensing device, which is typified by U.S. Pat. No. 5,511,694 to Rolm, is usable with very large pressurized containers. These (Rolm) type devices do not contact or directly monitor the liquid contents being dispensed. Instead, a simple position sensitive (e.g., mercury) switch is employed to indicate when a valve or tap suitably coupled to the container is open. Most Rolm type systems provide very approximate estimates as to how much liquid 'remains' in the container, and are no help in accurately determining how much liquid is actually dispensed and how many drinks are provided. Importantly, these systems (and equivalents) are inaccurate for several reasons. First the volume of liquid or fluid dispensed is indirectly determined via a time measurement. For example, Rolm employs a mercury or tilt switch to determine when a tap handle on the keg is in an open position. However, liquid will flow rate from the keg at slower rate when the tap is only half open. As such, devices like Rohm's may not detect that the valve is (partially) open, or may detect it by assuming the valve is fully open. Accuracy is also affected by the fact that the pressure, and therefore the flow rate, may vary considerably with such pressurized containers. As skilled persons will understand, simple indirect measuring techniques can be inherently problematic when accuracy is important.

There are yet other devices known in the art, that solve many of the above problems, but these devices or apparatus are much more complicated structurally, include motors, tilt switches, etc., and are quite expensive when compared to the above discussed devices. For example, U.S. Pat. No. 4.265, 370 to Reilly provides for a electrically controlled valve means to be opened for a specific period, when the container or bottle is sufficiently inverted, thereby metering out a specific and known measure of liquid. However, a simpler and lower cost arrangement, not involving power consuming motors and solenoids, is most desirable. In addition, it would be desirable to have a simple and relatively low cost device that also provides an indication of a total monetary value associated with dispensed volumes of liquid.

Skilled artisans will therefore recognize the need for an improved liquid dispensing device that includes readouts or indicators to monitor, with a reasonable accuracy, the number of times the container has been tilted, the volume of liquid dispensed (say by way of a calibrated time duration), the number of times the device is removed from the opening of the container (i.e., for container changing), and or the total and unit cost of a volume of liquid that has been dispensed from said container(s). A full understanding of the present invention, including an understanding of a number of capabilities, characteristics, and associated novel features, will result from a careful review of the description and figures of several embodiments provided herein. Attention is called to the fact, however, that the drawings and descriptions are illustrative only. Variations and alternate embodiments are contemplated as being part of the invention, limited only by the scope of the appended claims.

SUMMARY OF THE INVENTION

A dispensing device is provided with flow indicators for tracking information associated with a succession of pouring events of a liquid holding container upon which the dispensing device is installed. Each respective pouring event is arranged to cause a pre-determined volume of liquid to be dispensed from the container, and pouring related information, such as a total number of pours since a reset event, a cumulative monetary value of the pours since a reset event, a total number pours since a master reset operation, a total monetary value of the total number of pours since a master reset operation, a number of disconnects of the dispensing device from respective containers, etc., to be collected and suitably made available to a user.

The dispensing device includes a dispenser portion adapted for coupling with an opening in an upper portion of the liquid dispensing container. The dispenser portion including a conduit having an open upper end, which is disposed above the dispensing device outside of the container, and an open lower end, which is disposed within an interior of the container when suitably installed upon the container. The conduit may be structured to enable liquid to be conveniently dispensed from the container when the container is in an inverted position. An embedded controller or controller unit is also included and contained (or housed) within a suitable housing that is fixed to the dispenser portion. Importantly, flow detecting means also housed substantially within the housing are provided and structured to detect a pouring event during which liquid is being dispensed from the container. The flow detecting means, such as a simple tilt switch or flow sensitive switch, is operatively coupled to the embedded controller to indicate when a pouring event commences and when a pouring event terminates.

A user interface is further provided to enable the exchange of information between a user of the dispensing device and the embedded controller. The user interface is also operatively coupled to the controller thereby enabling a user to input information to the dispensing device, and to enable the user to receive information from the dispensing device. The user interface is suitably fixed to the housing to enable a user easy access to preferred components thereof, including a keypad of momentary and possibly maintained switches and an LCD display.

The embedded controller of an electronic module may be arranged to determine when a pouring event commences, when a predetermined length of time has elapsed and the pouring event should end, and preferably provide to the user an end signal by way of an annunciator and or an audio tone. The embedded controller may most preferably be further arranged to update and provide to the user pouring related information (as indicated above).

Another aspect of the invention calls for the adjustment, say via the embedded controller's application program, of a duration limit (or current duration limit) of pouring events by a predetermined correction increment, after at least one respective pouring event occurs. As such, as the liquid contents of the container are dispensed, an accurate correlation is maintained between the duration of a pouring event and a volume of liquid that is actually poured or dispensed from the container during said pouring event. The accuracy is maintained by adjusting a pouring event duration limit or interval so that a following respective pouring event takes a bit more time, compensating for the gradual decrease in the flow rate caused by the reduction of liquid in the container.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 5 provides a high level block diagram of important functional items of the apparatus of the invention.

DETAILED DESCRIPTION AND MODES OF THE INVENTION

It is important to establish the definition of a number of terms and expressions that will be used throughout this disclosure. The terms 'liquid holding container' and 'container' may be assumed to indicate any liquid holding means, such as a bottle, jug, etc., which can be held by a user and inverted to dispense therefrom a pre-determined volume of liquid from an opening in an upper portion of the container. Also, each time the container is inverted and said volume is dispensed, a 'pouring event' is said to have occurred. Other important terms and definitions will be provided, as they are needed, to properly and concisely define the present invention and its associated novel characteristics and features.

Figure 1:
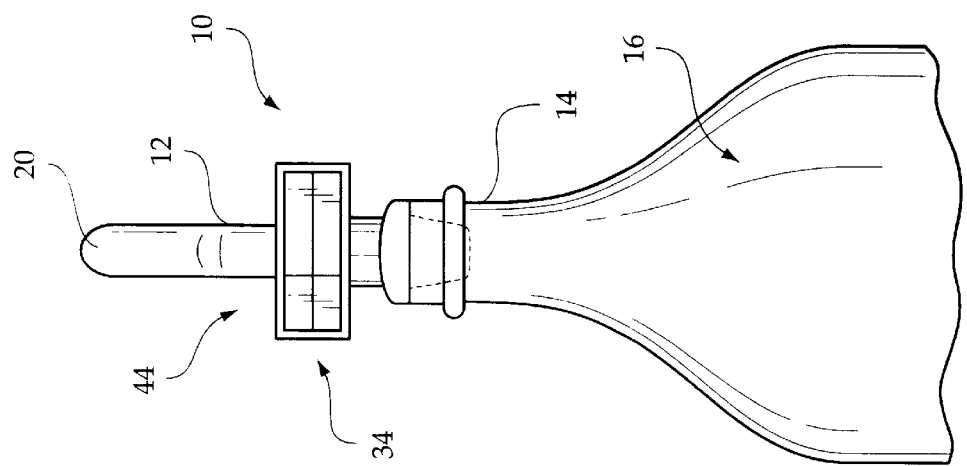
FIG. 1 is a front view of a preferred embodiment of the dispensing device with flow indicators in accordance with the principles of the present invention. The dispensing device is shown suitably installed upon and coupled to a liquid dispensing container.

With reference now to the drawings, a preferred embodiment of the dispensing device 10 with flow indicators is depicted. The flow indicators are part of a user interface that is provided for tracking information associated with respective pouring events (or a succession of such events) wherein liquid within the liquid holding container 16 is dispensed with each pouring event. It may be noted that an expression such as 'indications associated with pouring events', or similar expressions, may be assumed to be equivalent to the expression 'information associated with a pouring event'. As can be seen in FIG. 1, a container 16 is provided upon which the dispensing device 10 is installed. A dispenser portion 12 is adapted for coupling with an opening in an upper portion 14 of the liquid holding container 16. The dispenser portion 12 further includes a conduit 18 having an open upper end 20, which is most preferably disposed above the dispensing device 10 outside of the container 16, and an open lower end 22, which is disposed within an interior of the container when suitably installed upon the container. The conduit 18 is structured to enable a volume of liquid to be dispensed from the container 16 when the container is in an inverted position (not shown). As such, when suitably and or substantially inverted, liquid within the container 16 may be poured or dispensed from the container 16 by way of the conduit 18 of the dispenser portion 12. As will be discussed in greater detail below, each pouring event results in indications being determined for the tracking of pour related information, with the information (or a portion thereof) being made continuously available to a user. The information may be communicated to a user by way of a display such as display 44.

Figure 4:
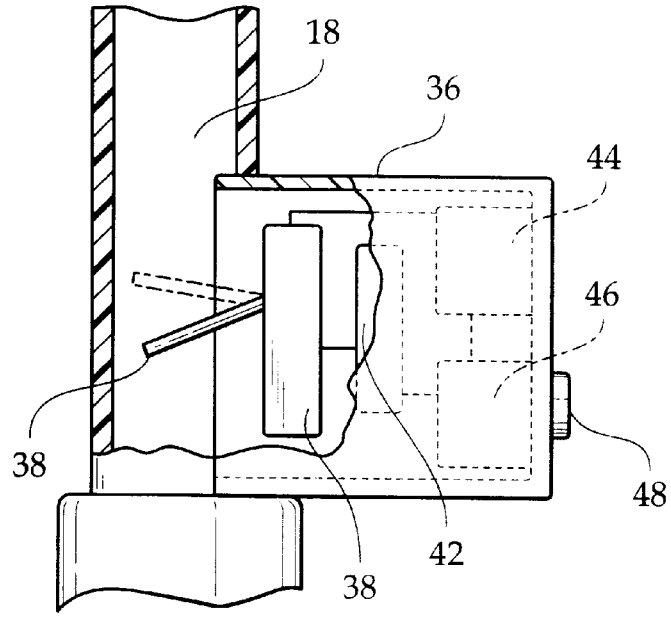
FIG. 4 is an enlarged partial sectional view of the present invention taken from circle 4 of FIG. 3.

Also included with the dispensing device 10 is an embedded computer or embedded controller 42, which is substantially contained within a housing 36. The housing 36 is fixed to the dispenser portion 12. A flow detecting switch 38, as best seen in FIG. 4, or any suitable flow detecting means, is also housed substantially within the housing 36 and structured to detect a pouring event during which liquid is being dispensed from the container 16 via the conduit 18. The flow detecting means, such as a flow sensitive switch 38 is operatively coupled to the embedded controller 42 to indicate when a pouring event commences and when a pouring event terminates. A user interface including a display 44 and a keypad 48 is provided to enable the exchange of information between a user of the dispensing device 10 and the embedded controller 42. The user interface is preferably operatively coupled to the controller 42 thereby enabling a user to input information to the dispensing device 10 and receive information therefrom. As illustrated in FIGS. 1, 4, and 5, the display 44 and keypad 48 may be suitably fixed to the housing 36 to enable a user easy access to the user interface.

The embedded controller 42, which may be termed a 'controller unit', may be provided in a microprocessor based 'programmed' embodiment, or alternately as a finite state machine provided via a programmable logic device, and is arranged to determine when a pouring event commences and when a pouring event is terminated. In addition, it is contemplated that the embedded controller 42 may be employed to aid in a very accurate dispensing of the desired pre-determined volume of liquid. This accuracy is made possible by sensing the start of a pouring event, determining when a predetermined length of time has elapsed, and indicating that the pouring event should end. For example, the end of a pouring event may simply involve providing to the user a suitable end signal. Preferred end signals provided to the user may include changing the state of an annunciator such as a light emitting device (e.g., turned on with tilting, blinks when duration expires, shuts off when not tilted), or possibly the generating of one or more audio tones that may be heard by the user (to deliver an 'end signal').

Once the end signal is provided, or shortly thereafter, the embedded controller 42 will preferably update and provide to the user pouring related information. As discussed, the pouring related information may include a 'total number of pours' since a reset event, and also a 'cumulative monetary' value or total for all the pours since a reset event. A reset event may be initiated by the embedded controller 42 when a user inputs a pre-determined (stored) reset event sequence of key presses. The sequence of keypresses may be provided to the embedded controller 42 by way of the keypad 48, and will cause certain information (e.g., total pours, total monetary value, etc.) to be reset to zero or another desired initial value. Similarly, a master reset event, initiated in an equivalent manner, may be assumed to reset other items or counts including a number of times the dispensing device 10 has been removed from the opening 14 of the container 16. For example, in a bar or restaurant setting, the dispenser device 10 may be removed and installed on a series of liquor containers (i.e., bottles) during the course of a typical day or evening. A count of the number of disconnects from respective containers, a total number pours since a master reset operation, and a total monetary value of the total number of pours since a master reset operation, will enable careful tracking of monies that should have been collected for the dispensing of a particular item, say vodka or wine (since the last master reset event).

As best shown in FIGS. 4 and 5, the flow detecting means, including flow sensitive switch 38, may be provided by a variety of well known means that are operatively coupled to the embedded controller 42. For example, a mercury switching device may be employed (as a flow detecting means) to indicate when the container 16 is in an inverted position (and it is assumed that liquid is being dispensed from the container). Alternately, as shown in FIG. 4, a flow detecting or flow sensitive switch 38 may be provided that is in communication with the conduit 18 to detect an actual flow of liquid from the container 16 caused by the container 16 being in a substantially inverted position. It should be noted that a 'substantially inverted position' may be assumed to indicate that the container is inverted with a vertical angle of less than 25 degrees from a truly vertical position—during which optimal accuracy associated with pouring events may be achieved. A most preferred flow sensitive switch 38 may be structured to include a flow detecting arm 40, which extends into the conduit 18, so as to enable the switch 38 to sense when liquid is being dispensed by way of the conduit 18. In a most preferred version, the flow detecting arm 40 may be biased to a first position when no liquid is being dispensed through the conduit 18. When the container is tilted and liquid is flowing, the flow detecting arm 40 would preferably move to a second position (shown as dotted lines in FIG. 4).

Figure 2:
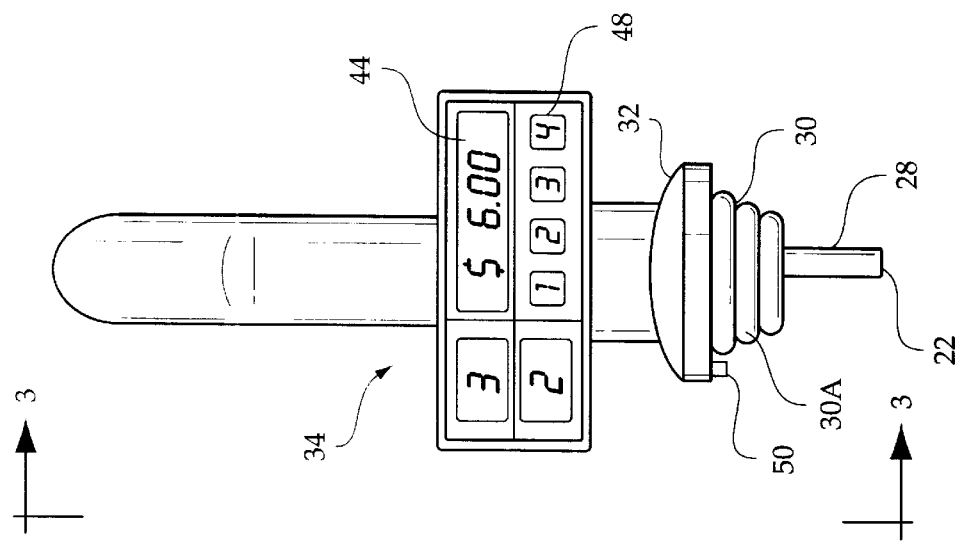
FIG. 2 is an enlarged and isolated front elevation view of the invention.
Figure 3:
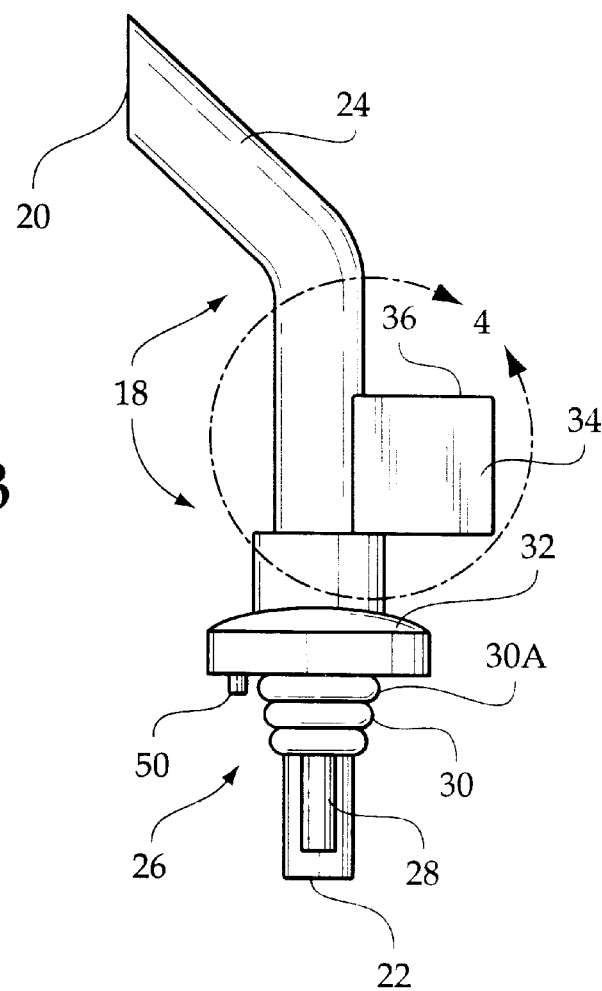
FIG. 3 is a side view of the present invention as taken along line 3—3 of FIG. 2.

Installation of the dispensing device 10 may be facilitated by a large variety of means. Skilled artisans will be able to provide many preferred arrangements and structures as a function of the particular container the liquid is to be dispensed from. For example, as shown in FIGS. 2 and 3, the dispenser portion 12 has a lower portion 26, through which items such as the lower end 22 of the conduit 18 and an air inlet 28 pass. As shown, a securing means 30 may include a compressible upper end 30a for engaging an interior portion or surface of the opening of the upper end 14 of the container 16. The lower portion 26 may preferably include a suitable flanged portion 32 for engaging an exterior top surface 16a of the opening 14 of container 16.

Referring now to FIG. 5, a high level block diagram of an embodiment of the invention is illustrated. An electronic module 34 includes one of a (possibly programmable) embedded controller 42 or alternately (and providing the equivalent functionality) a finite state machine possibly realized by a programmable logic device (PLD). The embedded controller 42 is operatively coupled to a flow detecting means, preferably including a flow sensitive switch 38, to determine when pouring is not occurring and when a pouring event is in progress. The electronic module 34, and or the embedded controller 42 thereof, would include a display 44 (most preferably a Liquid Crystal Display, LCD), which is operatively coupled to the controller 42 to receive and display information for viewing by a user. Also included are an audio unit 46 and a keypad 48. The keypad 48, which is depicted as a preferably linear series of key-switches, is employable by a user to input settings and reset commands, and other commands and indications, and the like. For example, it is contemplated that the keypad 48 may enable setting a nominal time limit for each pouring event, or most preferably setting a volume limit to be dispensed during each pouring event. Other items that are contemplated as being settable are: setting a monetary value to be associated with each pouring event, and or inputting information regarding physical properties of the container. Further a user may use the keypad to, when required, cause a reset event and or a master reset event. A respective reset event, including a basic reset and or a master reset event, enables a user to place the dispensing device in some initial condition, typically causing one or more counts or indications to be cleared or set to a suitable initial value. For example, it is contemplated that a reset event may cause the controller 42 of the electronic module 34 to reset certain counts or totals to zero. For example, a reset event may cause the resetting of items such as a total pours count, a disconnect or release count, or the total monetary value (amount).

The audio unit 46 is included to enable the controller 42 to indicate to a user when the pouring event has dispensed a pre-determined volume of liquid from the container 16, and should end. The dispensing device may be arranged to provide a simple audio indication to the user (say a simple tone) or a more complicated audio indication (say a time varying sequence of tones).

As shown in FIGS. 2, 3, and 5, a microswitch 50 may be included to support the detection and monitoring of the disconnecting of the dispensing device 10 from a series of emptied or spent containers, as desired to monitor and provide pouring related information and indications.

As discussed above, prior art dispensing devices have significant accuracy concerns and problems. One very common problem that arises with low cost dispensers, such as the aforementioned Wilson device, is caused by trying to time a pouring event with a fixed (time) duration limit. As is well known to skilled persons, the timing of a pouring event can be very accurate so long at the flow rate is constant. However, when considering a container of the type to which the present invention applies, the flow rate will decrease as liquid is dispensed and the volume of liquid in the container decreases. That is, when a liquid holding container is full, or nearly full, liquid flow rate is at a peak. As the container empties, the rate decreases due to a decrease of pressure upon the liquid at a dispensing location. As a result, the period of time required to dispense a pre-selected and uniform volume of liquid (with each pouring event) is shorter when the container is full than is would be when the container is half full or nearly empty. Skilled persons will understand that a table of correction values may be determined, possibly as a function of the type and size of the container, as well as other parameters and particulars, and be made available as needed to adjust a pouring duration to maintain accuracy. For example, after one or more pouring events have occurred, a value may be taken from the table to suitably increase the duration for the next one or more pouring events. Therefore, to provide for a more accurate correlation between the duration of a pouring event and a volume of liquid that is poured from the container 16 during a pouring event, the embedded controller 42 may be configured (say via a table lookup) to adjust the time duration of a pouring event, as a succession of spaced pouring events occur, and the container is emptied.

In order to not obfuscate the essential functional and operational characteristics of the embodiments of the present invention as illustrated, certain items have been omitted. For example, the inclusion of a power source 52, such as a (rechargeable) battery and a power regulator, has been omitted in FIGS. 1 through 4. Items such as this, or others and equivalents thereof, which have been depicted at a high level in FIG. 5, may certainly provided by skilled persons.

It is must further be understood that the architectural and operational embodiments described herein are exemplary of a plurality of possible arrangements to provide the same (or equivalent) general features, characteristics, and general system operation. Therefore, while there have been described the currently preferred embodiments of the present invention, those skilled in the art will recognize that other and further modifications may be made without departing from the spirit of the present invention, and it is intended to claim all modifications and variations as fall within the scope of the appended claims.

What is claimed is:

1. A programmable liquid dispensing device with user readable indicators for tracking information associated with a succession of pouring events of a liquid holding container upon which the dispensing device is installed, with each respective pouring event causing a pre-determined volume of liquid to be dispensed from the container, the dispensing device comprising:

a dispenser portion adapted for coupling with an opening in an upper portion of the container, the dispenser portion including a conduit having an open upper end, which is disposed above the dispensing device outside of the container, and an open lower end, which is disposed within an interior of the container when suitably installed upon the container, the conduit structured to enable liquid to be dispensed from the container when the container is in an inverted position;

an embedded controller housed within an interior of a housing that is fixed to the dispenser portion;

flow detecting means also housed substantially within the housing and structured to detect a pouring event during which liquid is being dispensed from the container, the flow detecting means operatively coupled to the embedded controller to indicate when a pouring event commences and when a pouring event terminates;

a user interface provided to enable the exchange of information between a user of the dispensing device and the embedded controller, the user interface operatively coupled to the controller, enabling a user to input information to the dispensing device and receive information therefrom, the user interface suitably fixed to the housing to enable a user easy access thereto;

the embedded controller arranged to determine when a pouring event commences, when a predetermined length of time has elapsed and the pouring event should end, and further arranged to provide the user an end signal and provide to the user updated pouring related information via the user interface.

2. The dispensing device in accordance with claim 1, wherein the pouring related information includes a total number of pours since a reset event and a cumulative monetary value of the pours since a reset event.

3. The dispensing device in accordance with claim 2, wherein the pouring related information further optionally includes a total number of pours since a master reset operation, a total monetary value of the total number of pours since a master reset operation, and a number of disconnects from respective containers the dispensing device has been installed thereupon since a master reset operation.

4. The dispensing device in accordance with claim 1, wherein the end signal is provided to a user by at least one of:

a) changing the state of an annunciator of a display; and b) generating an audio tone.

5. The dispensing device in accordance with claim 1, wherein the flow detecting means is provided by a structure selected from a group of structures consisting of:
   a) a tilt sensitive switch that is operatively coupled to the embedded controller to indicate when the container is in an inverted position and it is assumed that liquid is being dispensed from the container; and
   b) a flow detecting switch being in communication with the conduit to detect a flow of liquid from the container caused by the container being in a substantially inverted position.

6. The dispensing device in accordance with claim 5, wherein the flow detecting switch is structured with a flow detecting arm extending into the conduit so as to enable the switch to sense when liquid is being dispensed.

7. A dispensing device with user readable indicators for use with a liquid holding container for dispensing amounts of the liquid by inverting the container, the dispensing device configured for tracking, with a reasonable accuracy, indications associated with pouring events, each pouring event causing the removing of a pre-selected volume of liquid from the container, the dispenser device comprising:
   a dispenser portion adapted for secure installation within an opening in an upper portion of the liquid holding container, the dispenser portion including a dispensing conduit having an open upper end disposed outside and above the opening of the container and an open lower end disposed within an interior of the container, wherein the conduit is employed to dispense liquid while the container is in a substantially inverted position, the dispenser portion further including means enabling the dispensing device to be securely installed in the opening of the container so that the dispensing of liquid is only by way of the conduit;
   a housing portion having an interior space, the housing portion fixed to the dispenser portion;
   an electronic module that is substantially housed within the housing portion;
   a flow detecting switch also housed substantially within the housing and in communication with the conduit to detect a flow of liquid through the conduit that is associated with a pouring event wherein liquid is dispensed from the container, a pouring event occurring when the container is placed in a substantially inverted position;
   the electronic module including a controller unit that is operatively coupled to the flow detecting switch to determine when the switch is in the first position indicating no pouring is occurring and when the switch is in the second position indicating a pouring event is in progress;
   a user interface operatively coupled to enable the exchange of information between a user of the dispensing device and the controller unit, the user interface thereby enabling a user to input information to configure and operate the dispensing device and receive information therefrom;
   the user interface providing indications including when the length of a pour has reached a pre-determined duration limit, a total number of pours since a reset event, a cumulative monetary value of the pours since a reset event.

8. The dispensing device in accordance with claim 7, wherein the user interface selectively provides indications to a user including, a total number of pours since a master reset event, a cumulative monetary value of pours since a master reset event, and a total number of disconnects since a master reset event.

9. The dispensing device in accordance with claim 7, wherein the flow detecting switch is configured to remain biased in a first position until a sufficient inverting of the container occurs and the dispensing of liquid within the container causes the flow detecting switch to be placed in a second position until the container is empty or placed back in an upright position.

10. The dispensing device in accordance with claim 9, wherein the flow detecting switch includes a flow sensing arm disposed within the conduit and configured to move from the first position to the second position only when a pouring event is occurring.

11. The dispensing device in accordance with claim 7, wherein the controller is provided by an embedded computer including:
   a) a Liquid Crystal Display operatively coupled to the embedded computer to receive and display information for viewing by a user;
   b) an audio unit and a keypad, with the audio unit included to enable the controller to indicate to a user when the pouring event has dispensed a pre-determined volume of liquid from the container.

12. The dispensing device in accordance with claim 11, wherein the keypad is employable by an individual to configure the dispensing device by indicating information to the controller including at least one of:
   a) setting a nominal time limit for each pouring event;
   b) setting a volume limit to be dispensed during each pouring event;
   c) setting a monetary value to be associated with each pouring event;
   d) input information regarding physical properties of the container;
   e) causing a reset event; and
   f) causing a master reset event.

13. The dispensing device in accordance with claim 7, wherein a current duration limit of a pouring event is increased by a pre-determined correction increment, after at least one respective pouring event occurs, to provide for a more accurate correlation between the duration of a pouring event and a volume of liquid that is poured from the container during a pouring event, as the liquid contents of the container are dispensed.

14. A dispensing device with user readable indicators for tracking information associated with a succession of pouring events, wherein a pre-determined volume of liquid is poured from a liquid holding container upon which the dispensing device is installed, with each respective pouring event, the dispensing device comprising, in combination:
   a dispenser portion adapted for coupling with an opening in an upper end of the container, the dispenser portion including a conduit having an open upper end, which is disposed above the dispensing device outside of the container, and an open lower end, which is disposed within an interior of the dispensing device when suitably installed upon the container;
   an embedded computer contained within a housing that is fixed to the dispenser portion;
   flow detecting means also housed substantially within the housing and structured to detect a pouring event during which liquid is being dispensed from the container, the flow detecting means operatively coupled to the embedded controller to indicate when a pouring event commences and when a pouring event terminates;

a user interface operatively coupled to enable the exchange of information between a user of the dispensing device and the embedded controller, the user interface thereby enabling a user to input information to the dispensing device and receive information therefrom;

the embedded controller arranged to determine when a pouring event commences, when a predetermined length of time has elapsed and the pouring event should end, and provide to the user an end signal and updated pouring related information;

the embedded controller further arranged to adjust a current duration limit of pouring events by a predetermined correction increment, after concluding at least one respective pouring event, to provide for a more accurate correlation between the duration of a pouring event and a volume of liquid that is poured from the container during subsequent pouring events, as the liquid contents of the container are gradually dispensed.

* * * * *